Patented May 28, 1946

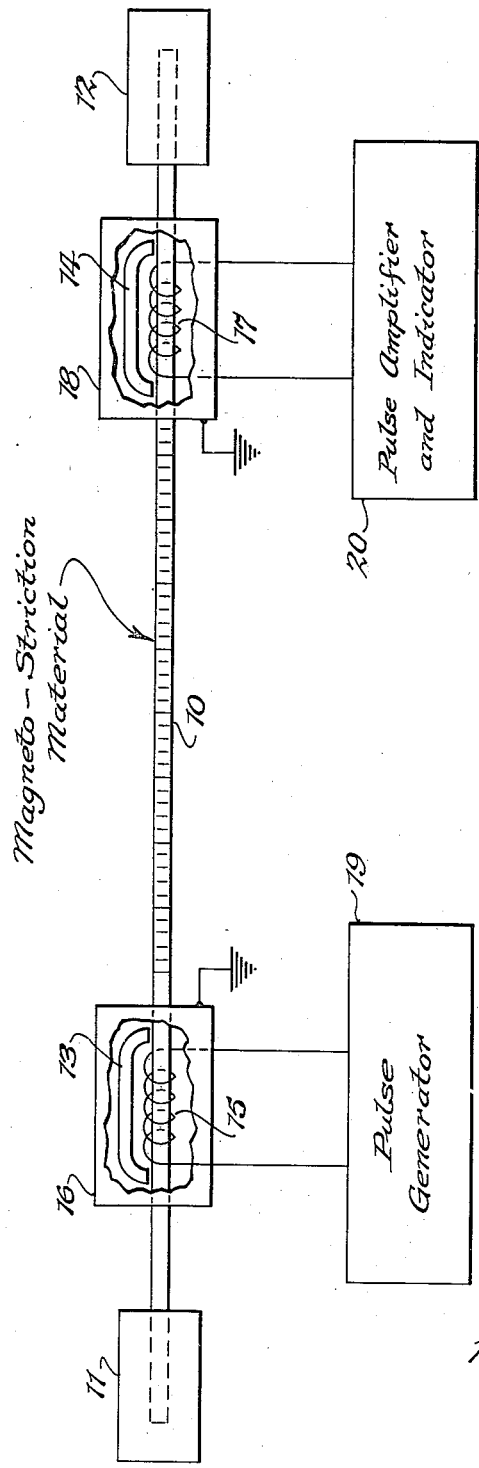

2,401,094

UNITED STATES PATENT OFFICE 2,401,094

TIME DELAY APPARATUS

Madison G. Nicholson, Jr., Snyder, N. Y., assignor to Colonial Radio Corporation, Buffalo, N. Y.

Application June 23, 1944, Serial No. 541,743

11 Claims. (Cl. 161—15)

This invention relates to time delay apparatus, and more particularly to apparatus for obtaining variable and controllable time delays of extremely short duration, of the order of 10 to 1,000 microseconds.

In certain types of work it is desirable to be able to measure time intervals of the order of 10 to 1,000 microseconds with considerable accuracy, as in the use of radar, where the distance to an object is determined by the time required for radio waves transmitted from a predetermined point to reach the object to be located and be reflected or echoed back to the point of origin.

Electrical delay circuits are known by which this may be done, but such electrical equipment is extremely bulky, complicated, and expensive. I have discovered that time intervals of the order mentioned may be measured quite accurately and with extremely simple apparatus by making use of magneto-striction effects.

It is an object of this invention to provide simple, inexpensive, and reliable apparatus for measuring time intervals of the order of from 10 to 1,000 microseconds.

It is a further object of this invention to provide such apparatus which does not involve complicated, bulky, and expensive electrical circuits.

It is still a further object of my invention to provide such apparatus utilizing magneto-striction effects.

It is still a further object of my invention to provide apparatus of the class described in which the apparatus may be directly calibrated in time intervals or distance so that these may be read directly from a scale on the apparatus.

Still other objects and advantages of my invention will be apparent from the specification.

The features of novelty which I believe to be characteristic of my invention are set forth with particularity in the appended claims. My invention itself, however, both as to its fundamental principles and as to its particular embodiments, will best be understood by reference to the specification and accompanying drawing, in which the single figure is a diagrammatic illustration of apparatus in accordance with my invention.

Referring now more particularly to the drawing, 10 indicates a rod or wire of any suitable magneto-striction material. The ends of the rod or wire 10 may be supported in any suitable manner, but preferably are provided with damping material so that sound waves reaching the end are not reflected back in any amount sufficient to cause trouble. Very satisfactory results may be obtained when the ends of the rod or wire are imbedded in blocks of beeswax, as indicated at 11 and 12.

Adjacent to one end of the rod there may be provided a coil 15 surrounding the rod or wire, and which I term the transmitting coil. This coil may be enclosed within a shielding grounded container 16 partly broken away to show the coil.

A permanent magnet 13 is diagrammatically indicated, to keep the rod or wire magnetized sufficiently to retain good magneto-striction conversion.

The coil 15 may be supplied with direct current pulses from a pulse generator 19 of any suitable type. As will be understood, when a direct current is passed through the coil 15, there occurs a momentary lengthening or shortening of the rod or wire 10, depending on the direction of current flow. This momentary distortion in the length of the rod or wire 10 at the point of coil 15 then travels down the rod in opposite directions as a sound wave, and its speed of travel is equal to the velocity of sound in the particular material at the particular temperature.

The waves reaching the block of beeswax 11 are absorbed or damped out to such a degree that no troublesome reflection occurs. The sound wave may be detected at any point in the rod or wire 10 by the use of a pick-up which may comprise coil 17 surrounding the rod or wire 10 and feeding a suitable amplifier 20 and indicator. In this case, as in the transmitter section, a permanent magnet 14 is diagrammatically indicated for the purpose of keeping the rod magnetized sufficiently to retain good magneto-striction conversion, and the coil 17 may be enclosed within a shielded and grounded container 18 shown partly broken away.

As the sound wave produced by a current pulse in coil 15 travels through coil 17, as will be understood, it generates an electromotive force in coil 17 which may be amplified to any suitable extent by the pulse amplifier 20 and applied to any suitable indicating apparatus, such as an oscilloscope.

The rod may be calibrated in units of time or (for radar use) in units of miles, the latter being derived by multiplying the speed of light by the particular time interval.

The entire detecting assembly, consisting of the coil 17, magnet 14, and shielding container 18, may be movable on the rod or wire 10, and it will be understood that by moving the same closer to the transmitting end, the time interval is made smaller, and by moving it away the time interval is made larger.

In one application of my invention, in measuring the distance to an object, as in radar, when the transmitted wave is sent out, a pulse is passed into the coil 15. The receiving coil assembly may then be moved back and forth upon the rod 10 until the radio echo occurs at the same time that the pulse is picked up by coil 17.

The distance of the object causing the echo may then be determined by reference to the scale on the rod 10, and is equal to the distance between the coils 15 and 17 multiplied by the ratio of velocity of radio waves to that of sound waves in the magneto-striction material, the whole divided by 2, since the distance to the object is half of the total path of the radio waves to the object and return.

In this connection, it may be noted that the accuracy obtainable in the measurement of time intervals with apparatus according to my invention is a good deal better than the accuracy of other factors entering into this computation.

While I have indicated that coil 17 may be movable lengthwise of the rod or wire 10, the coil 15 may also be made movable, if desired, and the same result may be obtained by varying the position of coil 15 while permitting coil 17 to remain at the same point.

In this application I have particularly pointed out and distinctly claimed the part, improvement, or combination which I claim as my invention or discovery, and I have explained the principles thereof and the best mode in which I have contemplated applying those principles so as to distinguish my invention from other inventions.

While I have shown and described certain preferred embodiments of my invention, it will be understood that modifications and changes may be made without departing from the spirit and scope thereof, as will be clear to those skilled in the art.

I claim:

1. In time measuring apparatus, in combination, an aperiodic elongated member of magneto-striction material, a transmitting coil associated with said member, means for impressing a current in said coil to produce a wave traveling longitudinally of said elongated member, a receiving coil associated with said member and spaced from said transmitting coil, said receiving coil being fed forwardly from said transmitting coil and being otherwise isolated therefrom to prevent feedback thereto and an indicator associated with said receiving coil.

2. In time measuring apparatus, in combination, an aperiodic elongated member of magneto-striction material, a transmitting coil associated with said member, means for impressing a current in said coil to produce a wave traveling longitudinally of said elongated member, a receiving coil associated with said member and spaced from said transmitting coil, said receiving coil being fed forwardly from said transmitting coil and being otherwise isolated therefrom to prevent feedback thereto and an indicator associated with said receiving coil, one of said coils being movable longitudinally of said member.

3. In time measuring apparatus, in combination, an aperiodic elongated member of magneto-striction material, a transmitting coil surrounding said member, means for impressing a current in said coil to produce a wave traveling longitudinally of said elongated member, a receiving coil surrounding said member and spaced from said transmitting coil, said receiving coil being fed forwardly from said transmitting coil and being otherwise isolated therefrom to prevent feedback thereto and an indicator associated with said receiving coil.

4. In time measuring apparatus, in combination, an aperiodic elongated member of magneto-striction material, a transmitting coil surrounding said member, means for impressing a current in said coil to produce a wave traveling longitudinally of said elongated member, a receiving coil surrounding said member and spaced from said transmitting coil, said receiving coil being fed forwardly from said transmitting coil and being otherwise isolated therefrom to prevent feedback thereto and an indicator associated with said receiving coil, one of said coils being movable longitudinally of said member.

5. In time measuring apparatus, in combination, an aperiodic elongated member of magneto-striction material, a transmitting coil associated with said member, means for impressing a current in said coil to produce a wave traveling longitudinally of said elongated member, a receiving coil associated with said member and spaced from said transmitting coil, said receiving coil being fed forwardly from said transmitting coil and being otherwise isolated therefrom to prevent feedback thereto and an indicator associated with said receiving coil, one of said coils being movable longitudinally of said member, said elongated member having its ends provided with damping material to reduce harmful reflection of waves therefrom.

6. In time measuring apparatus, in combination, an aperiodic elongated member of magneto-striction material, a transmitting coil associated with said member, means for impressing a current in said coil to produce a wave traveling longitudinally of said elongated member, a receiving coil associated with said member and spaced from said transmitting coil, and an indicator associated with said receiving coil, said receiving coil being fed forwardly from said transmitting coil and being otherwise isolated therefrom to prevent feedback thereto one of said coils being movable longitudinally of said member, said elongated member having its ends provided with damping material to reduce harmful reflection of waves therefrom.

7. In time delay apparatus, in combination, an aperiodic elongated member of magneto-striction material, means for applying a magneto-striction impulse at one point on said member to produce a sound wave therein, and means for detecting said sound wave at another point on said member said detecting means being fed forwardly from said applying means and being otherwise isolated therefrom to prevent feedback thereto.

8. In time delay apparatus, in combination, an aperiodic elongated member of magneto-striction material, means for applying a magneto-striction impulse at one point on said member to produce a sound wave therein, and means for detecting said sound wave at another point on said member, one of said means being movable along said member said detecting means being fed forwardly from said applying means and being otherwise isolated therefrom to prevent feedback thereto.

9. In time delay apparatus, in combination, an aperiodic elongated member of magneto-striction material, means for applying a magneto-striction impulse at one point on said member to produce a sound wave therein, and means for detecting said sound wave at another point on said member, one of said means being movable along said member, said member having means at its ends for reducing reflections from said ends said detecting means being fed forwardly from said applying means and being otherwise isolated therefrom to prevent feedback thereto.

10. The method of measuring a range of short time intervals, which comprises magnetically generating a sound wave in an elongated path having magneto-striction properties, and electrically detecting said sound wave at a point on said path removed from the point of origin of said sound wave while maintaining the point of detection of said sound wave isolated from the point of transmission except for forward feed in said path.

11. The method of producing time delays of predetermined length which comprises producing a timing current impulse, impressing said impulse upon an elongated path having magneto-striction characteristics to generate a sound wave in said path, electrically detecting said sound wave at another point on said path, and controlling the distance between said points to control the time interval between initiation and detection of said sound wave while maintaining the point of detection of said sound wave isolated from the point of transmission except for forward feed in said path.

MADISON G. NICHOLSON, Jr.